(12) United States Patent  
Tanizaki et al.

(10) Patent No.: US 11,707,935 B2  
(45) Date of Patent: Jul. 25, 2023

(54) PRINTING APPARATUS

(71) Applicant: BROTHER KOGYO KABUSHIKI KAISHA, Nagoya (JP)

(72) Inventors: Masashi Tanizaki, Kuwana (JP); Masashi Iwamoto, Nagoya (JP); Ryuichi Kanda, Nagoya (JP); Yuya Nakamura, Toyoake (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 344 days.

(21) Appl. No.: 17/162,335

(22) Filed: Jan. 29, 2021

(65) Prior Publication Data

US 2021/0237474 A1    Aug. 5, 2021

(30) Foreign Application Priority Data

Jan. 31, 2020 (JP) ................. 2020-015262

(51) Int. Cl.
| | |
|---|---|
| *B41J 2/35* | (2006.01) |
| *H01M 50/244* | (2021.01) |
| *B41J 3/407* | (2006.01) |
| *H01M 50/247* | (2021.01) |
| *H01M 50/271* | (2021.01) |
| *B41J 3/36* | (2006.01) |

(52) U.S. Cl.
CPC . *B41J 2/35* (2013.01); *B41J 3/36* (2013.01); *B41J 3/4075* (2013.01); *H01M 50/244* (2021.01); *H01M 50/247* (2021.01); *H01M 50/271* (2021.01); *H01M 2220/30* (2013.01)

(58) Field of Classification Search
CPC ..... B41J 2/35; B41J 3/36; B41J 3/4075; B41J 29/00; B41J 29/02
See application file for complete search history.

(56) References Cited

U.S. PATENT DOCUMENTS

| | | | |
|---|---|---|---|
| 2005/0135861 A1 | 6/2005 | Mori et al. | |
| 2013/0194732 A1* | 8/2013 | Chiba ................. | H01M 50/247 |
| | | | 361/679.01 |

(Continued)

FOREIGN PATENT DOCUMENTS

| | | |
|---|---|---|
| JP | H09-306457 A | 11/1997 |
| JP | 2002-19229 A | 1/2002 |

(Continued)

*Primary Examiner* — Kristal Feggins  
(74) *Attorney, Agent, or Firm* — Kenealy Vaidya LLP

(57) ABSTRACT

A printing apparatus, having a casing, a printer, and a battery cover, is provided. The casing includes a battery compartment, to which a battery is attachable, and a terminal arranged inside the battery compartment. The printer is powered by the battery to print an image on a printable tape. The battery cover is attachable to the casing and, when at an attached position, covers at least a part of the battery compartment. The casing includes a guide arranged outside the battery compartment to guide the battery cover toward the attached position in the casing. The battery cover includes a first wall portion, which contacts the guide at an outer face thereof and slides along the guide as the battery cover moves toward the attached position, and a pressing portion to press the battery in the battery compartment against the terminal as the first wall portion slides along the guide.

10 Claims, 9 Drawing Sheets

(56) References Cited

U.S. PATENT DOCUMENTS

| | | | |
|---|---|---|---|
| 2014/0147187 A1* | 5/2014 | Jo ........................... | B41J 29/13 400/613 |
| 2015/0306873 A1* | 10/2015 | Jo ........................... | B41J 2/355 347/50 |
| 2017/0291438 A1 | 10/2017 | Hirose | |
| 2018/0079226 A1 | 3/2018 | Kubota et al. | |
| 2019/0184714 A1* | 6/2019 | Murabayashi ......... | B41J 3/4075 |

FOREIGN PATENT DOCUMENTS

| JP | 2004-22341 A | 1/2004 |
|---|---|---|
| JP | 2004-66530 A | 3/2004 |
| JP | 2014-182980 A | 9/2014 |
| JP | 2014-191871 A | 10/2014 |
| JP | 2016-120666 A | 7/2016 |
| JP | 2016-175382 A | 10/2016 |

* cited by examiner

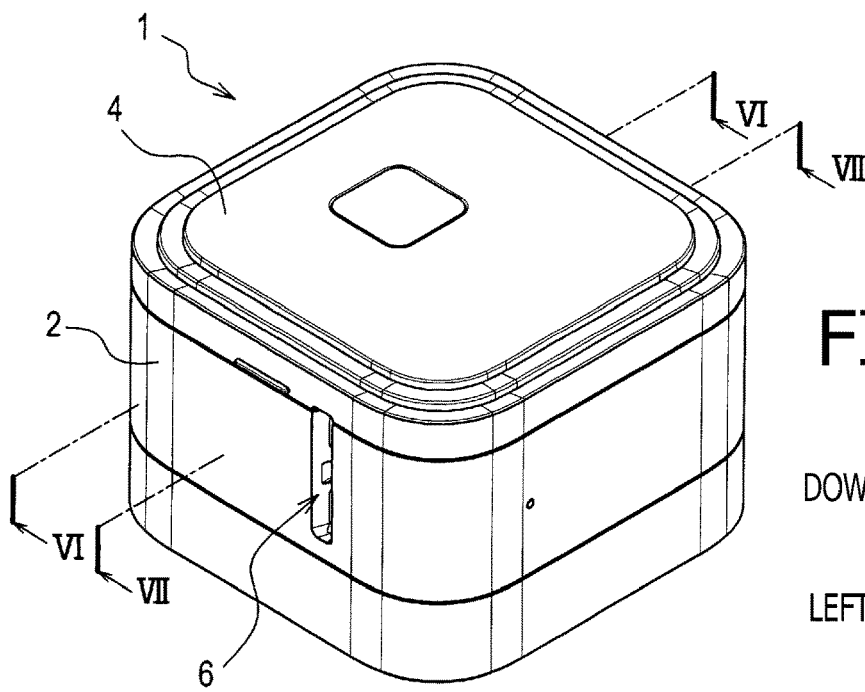
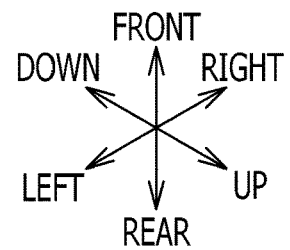
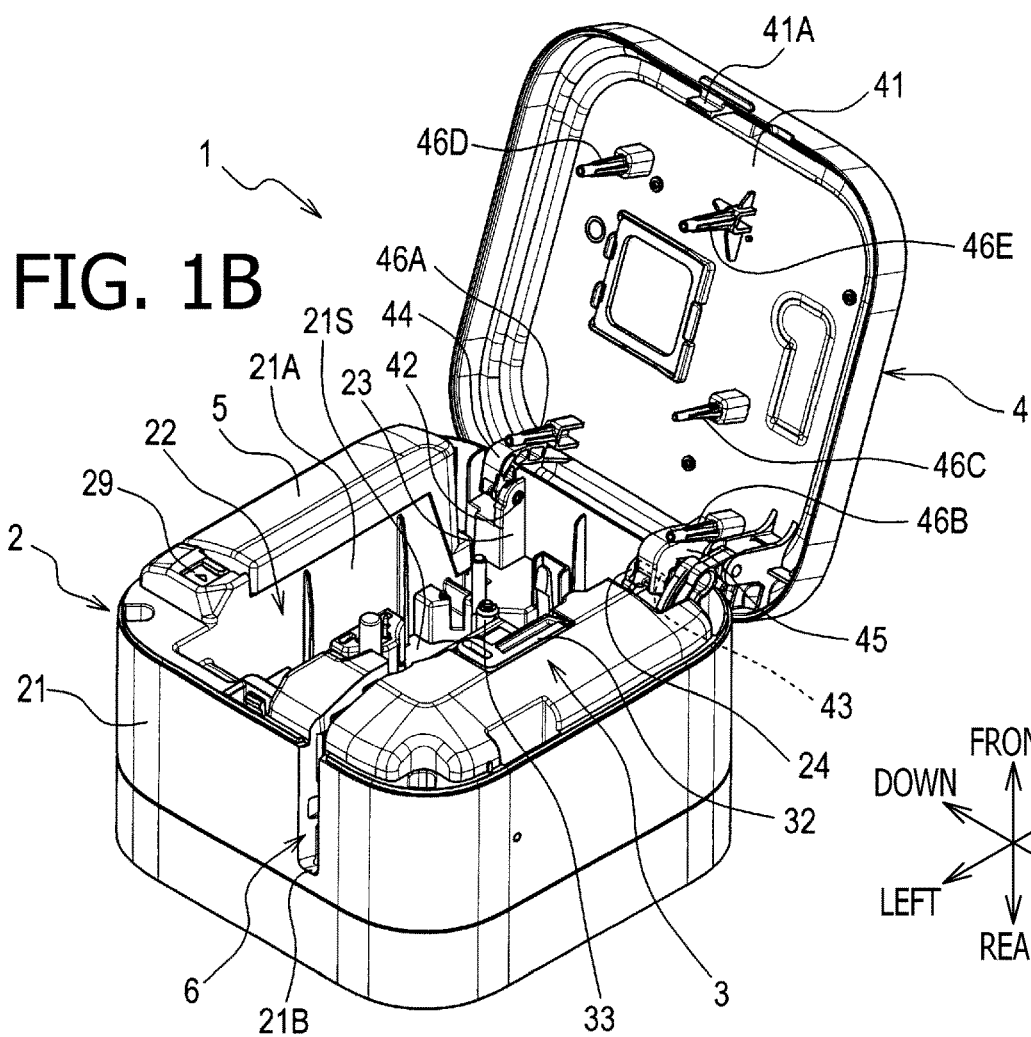
FIG. 1A
FIG. 1B

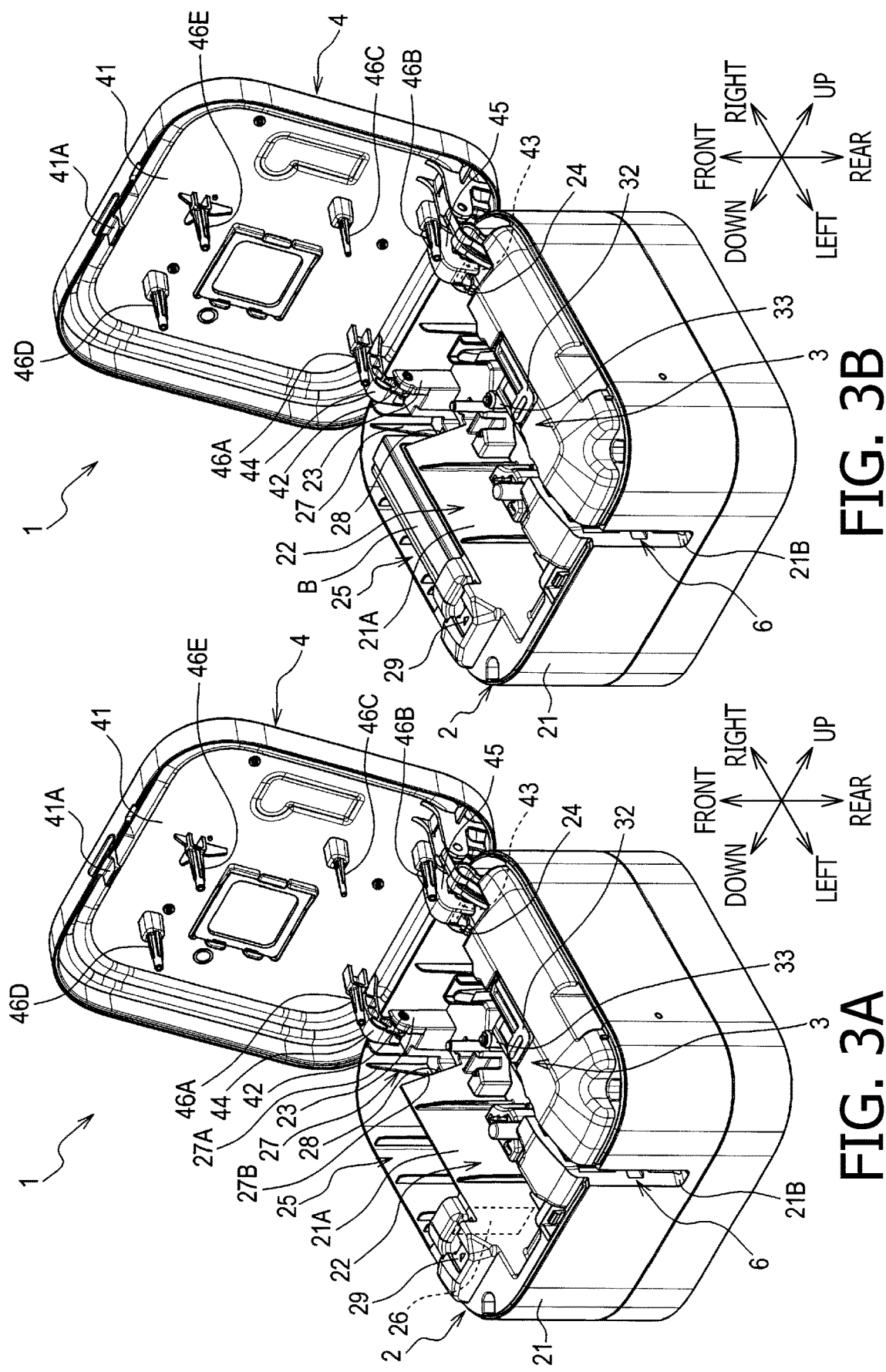

PRINTING APPARATUS

CROSS REFERENCE TO RELATED APPLICATION

This application claims priority from Japanese Patent Application No. 2020-015262, filed on Jan. 31, 2020, the entire subject matter of which is incorporated herein by reference.

BACKGROUND

Technical Field

An aspect of the present disclosure is related to a printing apparatus.

Related Art

A printing apparatus for printing an image on a printable tape by driving a printer head and rollers is known. The printable tape may be provided to the printing apparatus in a form of a cassette, which is attachable to a casing of the printing apparatus. The printing apparatus may be provided with a battery, which is attachable to the casing and may supply power to drive the printer head and the rollers.

The battery may be arranged to fit in a battery compartment formed inside the casing of the printing apparatus and covered with a battery cover, which may be attached to or detached from the casing. In order to stably establish electrical connection between the battery and a terminal in the casing, the battery cover may be designed to press the battery against the terminal.

SUMMARY

For example, the battery cover may be designed to press the battery in a specific direction while the battery cover is being attached to the casing of the printing apparatus. However, when a user attempts to attach the battery cover to the casing in a deviated direction with respect to the specific direction, and the battery may not be pressed in the specific direction. In such an occasion, the electrical connection between the battery and the terminal may not be securely established. For another example, the battery cover may not smoothly fit in a correct position in the casing due to a reaction force from the battery.

The present disclosure is advantageous in that a printing apparatus, in which a cover for a battery may be easily attachable to a casing, and in which the battery is electrically connectable to a terminal reliably, is provided.

According to an aspect of the present disclosure, a printing apparatus, having a casing, a printer, and a battery cover, is provided. The casing includes a battery compartment, to which a battery is attachable, and a terminal arranged inside the battery compartment. The printer is powered by the battery to print an image on a printable tape. The battery cover is attachable to the casing. The battery cover located at an attached position in the casing covers at least a part of the battery compartment. The casing includes a guide arranged outside the battery compartment. The guide guides the battery cover toward the attached position in the casing. The battery cover includes a first wall portion and a pressing portion. The first wall portion has an outer face. The first wall portion contacts the guide at the outer face and slides along the guide as the battery cover moves toward the attached position. The pressing portion presses the battery in the battery compartment against the terminal as the first wall portion slides along the guide.

BRIEF DESCRIPTION OF THE ACCOMPANYING DRAWINGS

FIG. 1A is a perspective view of a printing apparatus according to an embodiment of the present disclosure. FIG. 1B is a perspective view of the printing apparatus according to the embodiment of the present disclosure with a casing cover being at an open position.

FIG. 3A is a perspective view of the printing apparatus, from which a battery cover and a battery are removed, with the casing cover being at the open position as shown in FIG. 1B, according to the embodiment of the present disclosure. FIG. 3B is a perspective view of the printing apparatus, from which the battery cover is removed, with the casing cover being at the open position as shown in FIG. 1B, according to the embodiment of the present disclosure.

Figure 4A:
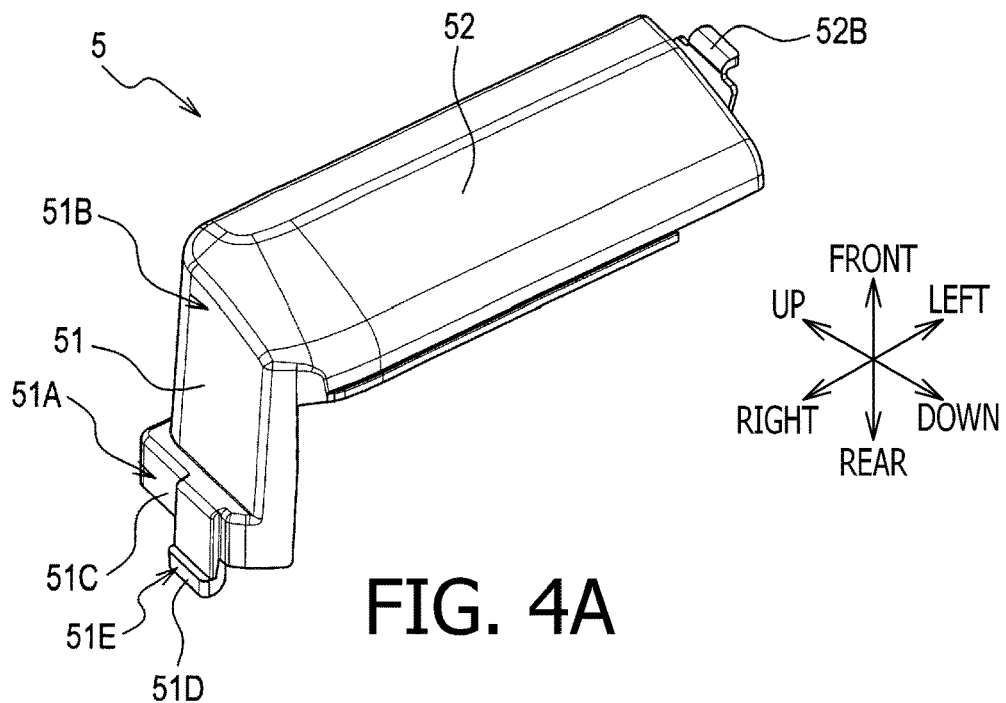
Figure 4B:
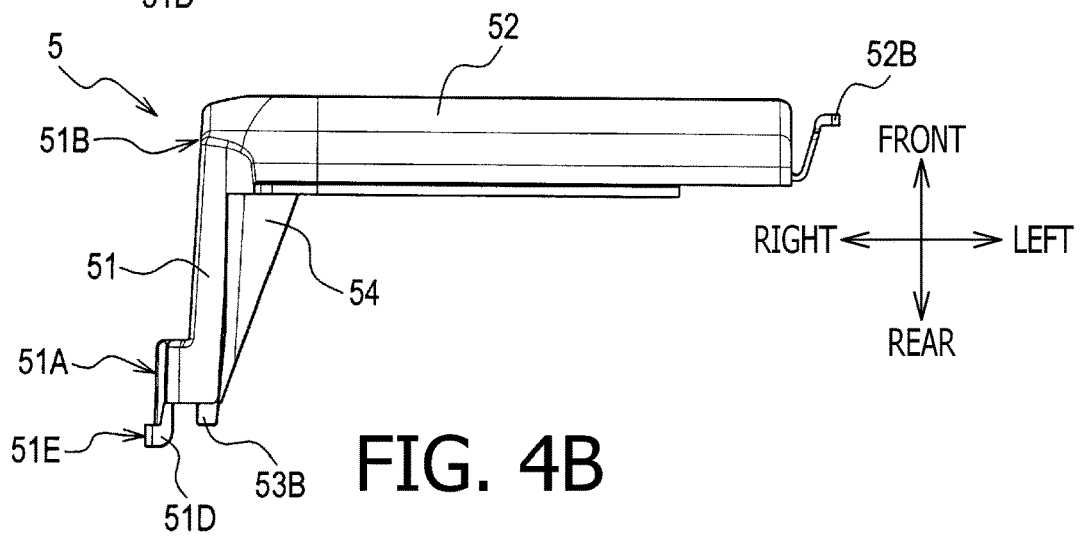
Figure 4C:
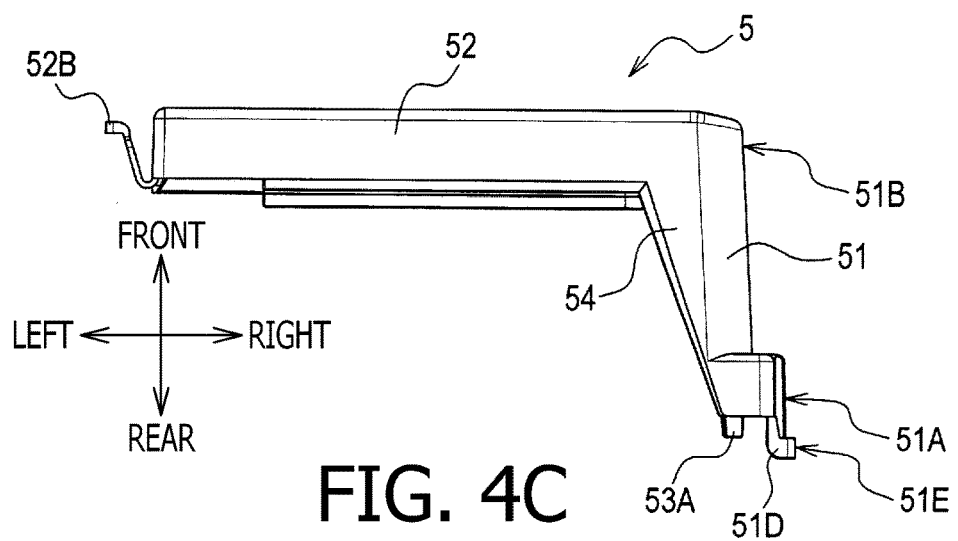

FIGS. 4A-4C are a perspective view, a front view, and a rear view, respectively, of the battery cover for the printing apparatus according to the embodiment of the present disclosure.

FIGS. 5A-5D are a plan view, a bottom view, a leftward side view, and a rightward side view, respectively, of the battery cover for the printing apparatus according to the embodiment of the present disclosure.

Figure 6:
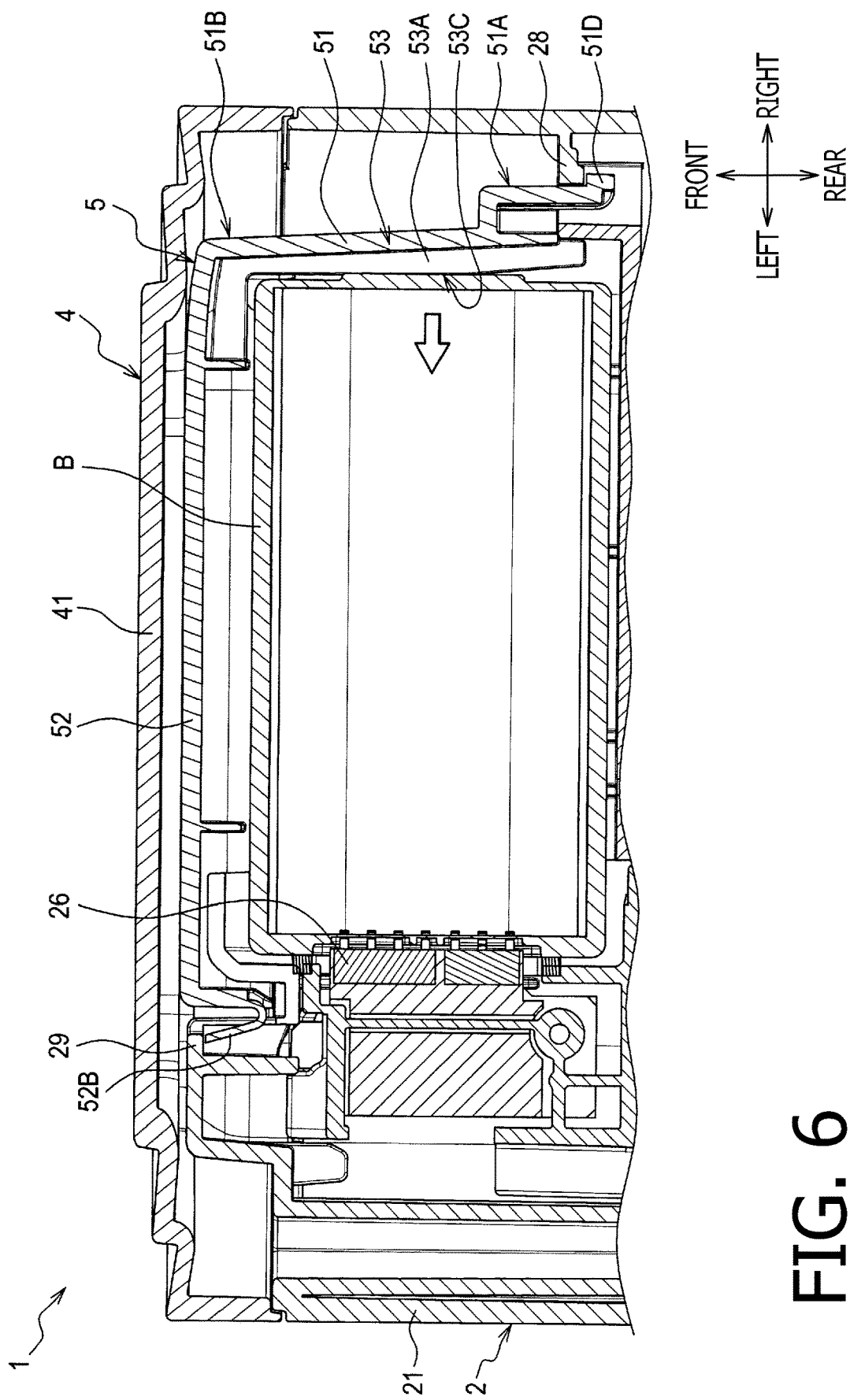

FIG. 6 is a cross-sectional view of the printing apparatus according to the embodiment of the present disclosure viewed along a line VI-VI shown in FIG. 1A.

Figure 7:
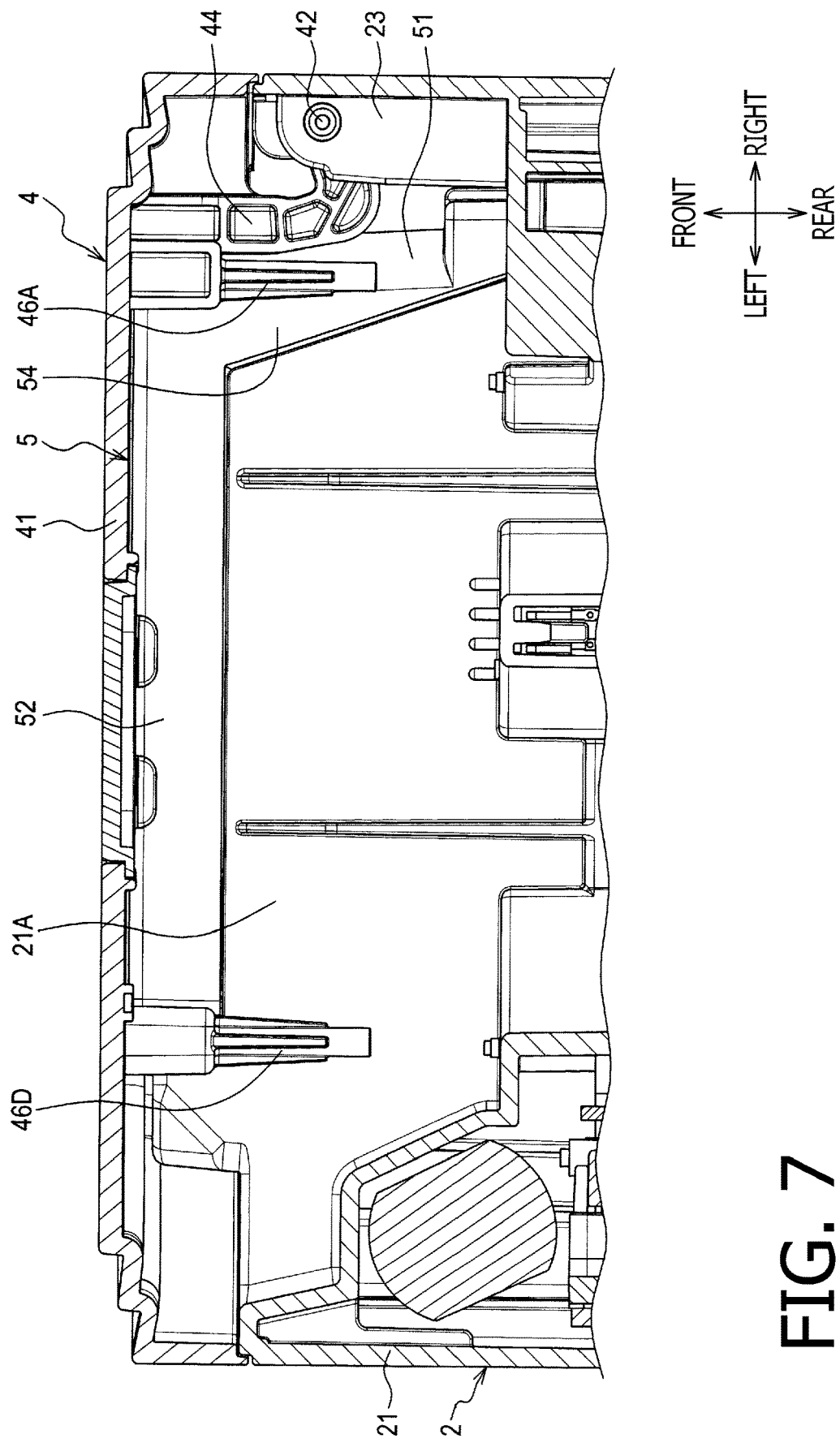

FIG. 7 is a cross-sectional view of the printing apparatus according to the embodiment of the present disclosure viewed along a line VII-VII shown in FIG. 1A.

Figure 8:
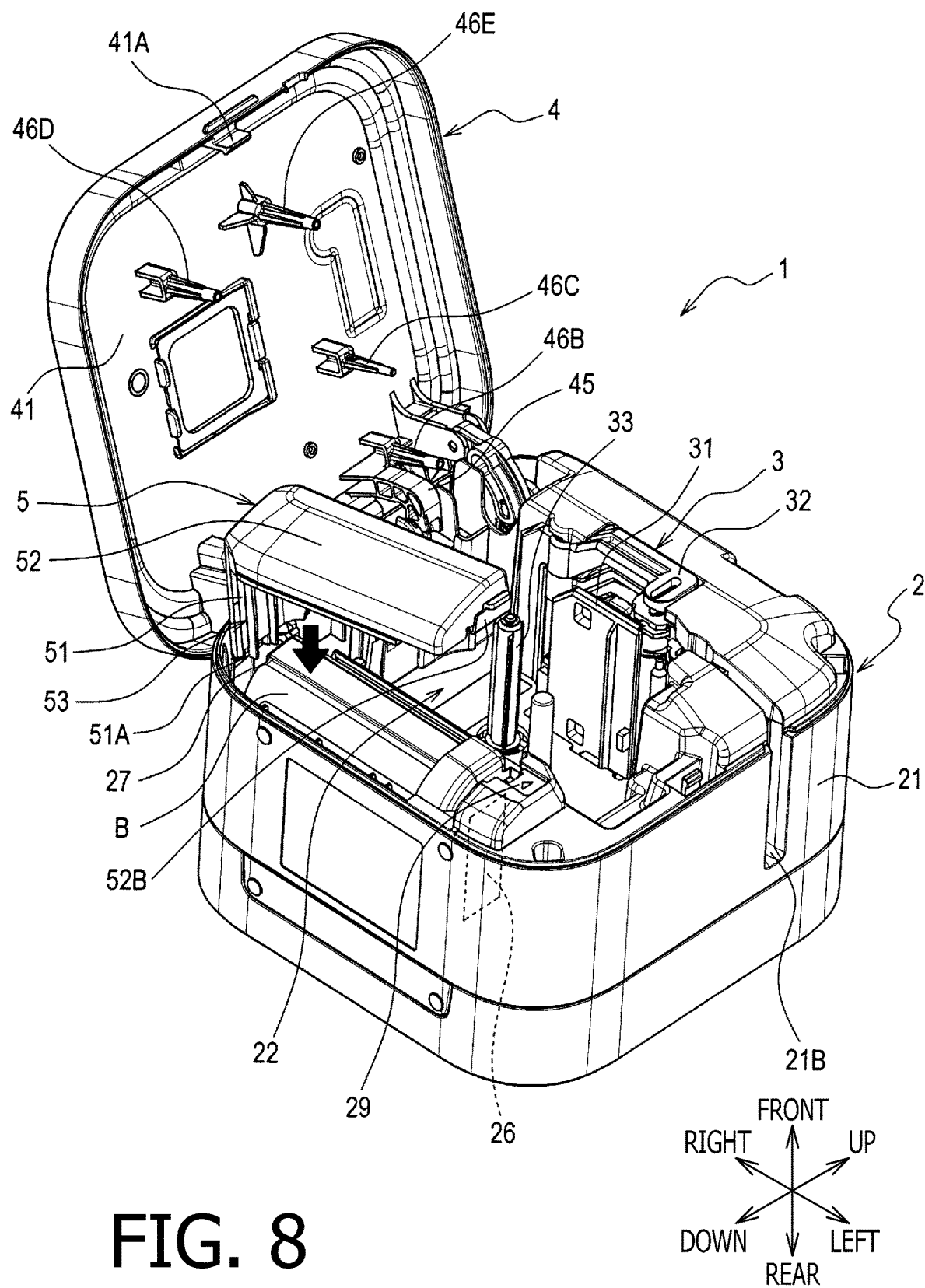

FIG. 8 is a perspective view of the printing apparatus with the battery cover being attached to a casing over a battery, with the battery cover being removed and the casing cover being at the open position as shown in FIG. 3B, according to the embodiment of the present disclosure.

Figure 9:
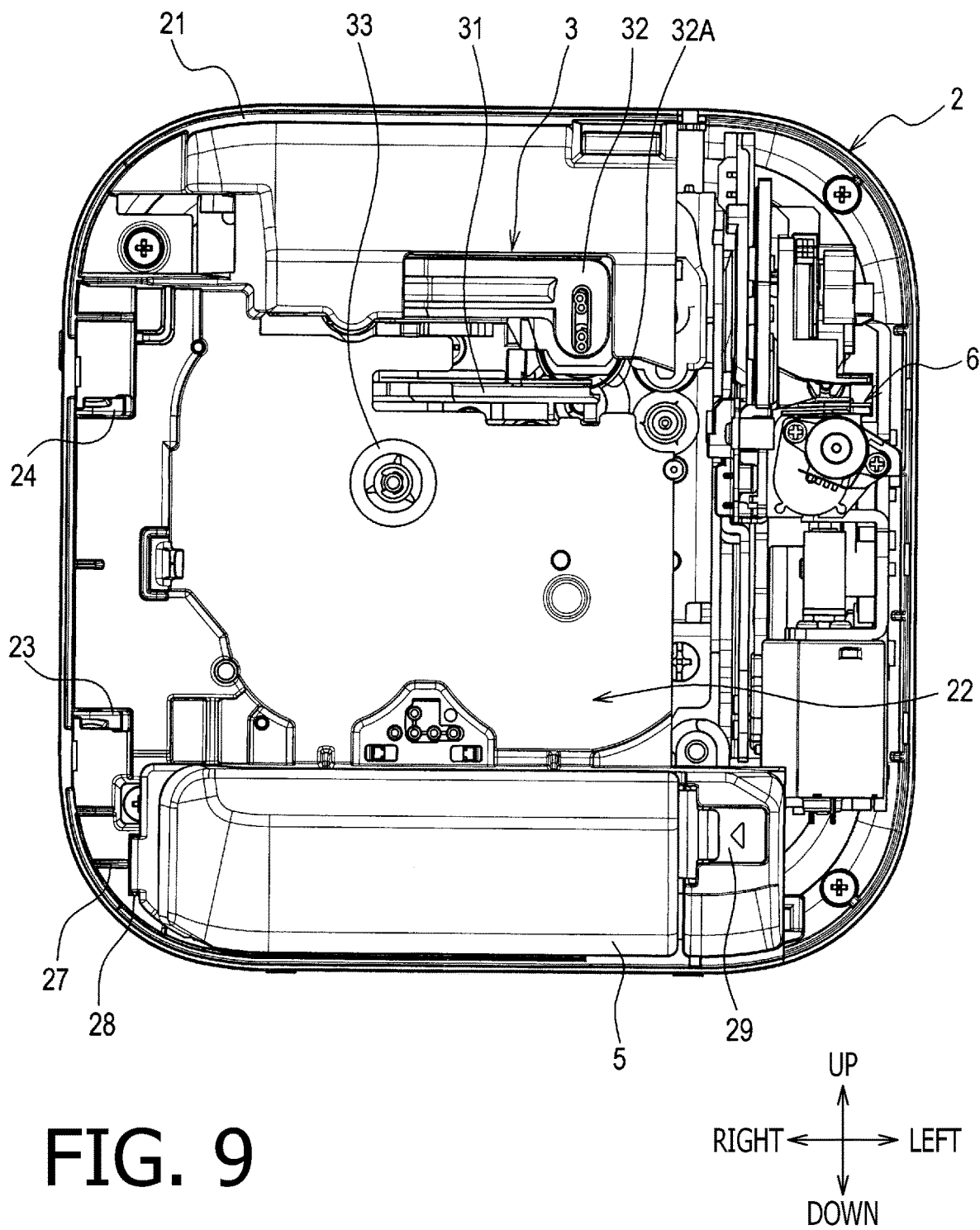

FIG. 9 is a plan view showing inside of the casing of the printing apparatus, when the printing apparatus is in the posture shown in FIG. 1A, according to the embodiment of the present disclosure.

DETAILED DESCRIPTION

1. First Embodiment

[1-1. Configuration]

A printing apparatus 1 includes a casing 2, a printer 3, a casing cover 4, a battery cover 5, and a cutter 6, shown in, for example, FIGS. 1A-1B.

The printing apparatus 1 may print an image on a printing medium in a form of a tape stored in a printer cassette, which is attachable to the casing 2. In other words, the printing apparatus 1 may print an image on a printable tape in a printer cassette (not shown) attached to the casing 2.

In the embodiment described below, directions related to parts and members included in the printing apparatus 1 will be mentioned on basis of a posture of the printing apparatus 1 with reference to arrows in each drawing. In particular, a direction, in which the printer cassette and a battery B are moved to be attached to the casing 2, will be defined as rearward, and a direction, in which the printer cassette and the battery B are moved to be removed from the casing 2, will be defined as frontward. A direction, in which the printable tape with the image printed thereon is ejected outside the casing 2, will be defined as leftward, and a direction opposite to the leftward direction will be defined as rightward. A front-to-rear or rear-to-front direction may be expressed as a front-rear direction, and a left-to-right or right-to-left direction may be expressed as a crosswise direction. A direction intersecting orthogonally with the front-rear direction and with the crosswise direction may be expressed as a vertical direction.

<Casing>

Figure 2:
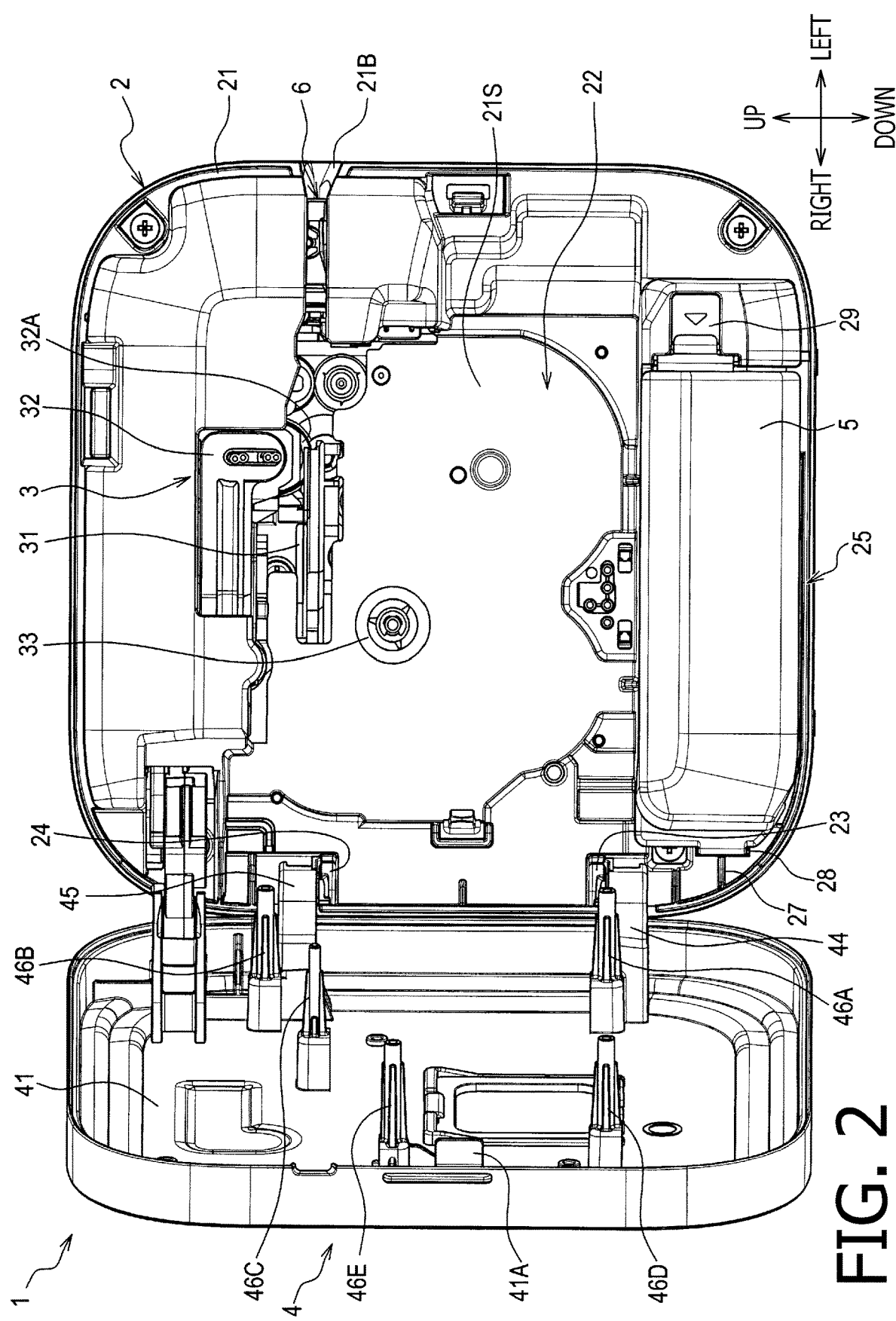
FIG. 2 is a plan view of the printing apparatus, with the casing cover being at the open position as shown in FIG. 1B, according to the embodiment of the present disclosure.

The casing 2 includes, as shown in FIGS. 2 and 3A, a main body 21, a cassette compartment 22, a first bearing 23, a second bearing 24, a battery compartment 25, a terminal 26, a guide 27, a first engageable portion 28, and a second engageable portion 29.

(Main Body)

The main body 21 has an approximately cubic form. The main body 21 forms external faces of the casing 2.

The main body 21 is open on a front side and closed on a rear side thereof. In a view along the front-rear direction, the main body 21 may have a form of a square with rounded corners. The main body 21 forms an upper face, a lower face, a leftward face, a rightward face, and a rear face of the printing apparatus 1. On the leftward face of the main body 21, an opening 21B is formed.

(Cassette Compartment)

The cassette compartment 22 is a recessed portion, in which the printer cassette containing the printable tape may fit to be attached to the casing 2. The cassette compartment 22 may locate the printer cassette at a correct position in the casing 2.

The printer cassette is exchangeable with another printer cassette; therefore, the printing apparatus 1 may be sustainably supplied with the printing media and use different types (e.g., colors, materials, etc.) of tapes in variety of occasions.

The cassette compartment 22 is defined by an inner face 21S of the man body 21 and an inner wall 21A arranged inside the main body 21. The cassette compartment 22 is open frontward, and the printer cassette may be moved from the front side towards the rear side to be set in the cassette compartment 22.

(Bearings)

The first bearing 23 supports a first rod portion 42 of the casing cover 4 rotatably. The second bearing 24 supports a second rod portion 43 of the casing cover 4 rotatably.

The first bearing 23 and the second bearing 24 are arranged on a rightward end in the inside of the main body 21. The first bearing 23 and the second bearing 24 are arranged rightward from the cassette compartment 22. The first bearing 23 and the second bearing 24 are arranged to be spaced apart from each other in the vertical direction.

(Battery Compartment)

The battery compartment 25 is a recessed portion, in which the battery B (see FIG. 3B) being a power source to the printer 3 is attachable.

The battery compartment 25 has an upper face, a lower face, a left-side face, and a rear face. The battery compartment 25 is open frontward and rightward. The battery B may be moved from the front side toward the rear side to be set in the battery compartment 25.

(Terminal)

The terminal 26 is arranged on the left-side face of the battery compartment 25. The terminal 26 is connectable with a terminal of the battery B attached to the battery compartment 25 to supply the power from the battery B to the printer 3.

(Guide)

The guide 27 is arranged outside the battery compartment 25. The guide 27 is a piece of laminar rib that may guide the battery cover 5 toward an attached position inside the casing 2.

The guide 27 is arranged on the rightward end in the inside of the main body 21. A direction of thickness of the guide 27 is parallel to the vertical direction. When the battery cover 5 is being attached to the casing 2, the guide 27 may contact a first wall portion 51 of the battery cover 5 at a leftward edge thereof.

As shown in FIG. 3A, the guide 27 has a starting portion 27A, at which an outer face 51E of the first wall portion 51 contacts the guide 27 earlier when the battery cover 5 is being attached to the casing 2, and a destination portion 27B, at which the outer face 51E of the first wall portion 51 contacts the guide 27 lastly when, for example, the battery cover 5 is completely attached to the casing 2. The starting portion 27A is located frontward with respect to the destination portion 27B.

The guide 27 spreads rearward, in other words, along a moving direction of the first wall portion 51 of the battery cover 5 when the battery cover 5 is being attached to the casing 2, to extend linearly larger in the crosswise direction. Therefore, the destination portion 27B is located leftward with respect to the starting portion 27A.

(Engageable Portions)

The first engageable portion 28 is a recessed portion or a hole, with which a first claw 51D may engage when the battery cover 5 is at the attached position. The first engageable portion 28 is formed on the rear face of the main body 21, which defines a rear end of the battery compartment 25, and is located rightward with respect to the battery compartment 25.

The second engageable portion 29 is a recessed portion or a hole, with which a second claw 52B may engage when the battery cover 5 is at the attached position. The second engageable portion 29 is located upper-leftward with respect to the battery compartment 25.

<Printer>

The printer 3 may be driven by a power from the battery B attached to the battery compartment 25 to print an image on the printable tape in the printer cassette being attached to the cassette compartment 22. The printer 3 includes, as shown in FIG. 2, a printer head 31, a movable part 32, and a driving shaft 33.

(Printer Head)

The printer head 31 is arranged inside the cassette compartment 22. The printer head 31 includes a plurality of heat-generating elements that may be controlled individually.

(Movable Part)

The movable part 32 is swingably attached to the casing 2 to swing on a plane, which spreads orthogonally to the front-rear direction. The movable part 32 includes a platen roller 32A, which may be driven to eject the printable tape outside the printing apparatus 1.

The movable part 32 may move toward the printer head 31 arranged inside the cassette compartment 22 to nip the printable tape in the printer cassette between the platen roller 32A and the printer head 31. In other words, the printable tape may be urged against the printer head 31 by the platen roller 32A.

As shown in FIG. 3A, the battery compartment 25, the cassette compartment 22, and the movable part 32 are arranged in this recited order from bottom to top along the vertical direction. In other words, the battery compartment 25 is arranged to be lower than the cassette compartment 22, and the movable part 32 is arranged to be higher than the cassette compartment 22.

(Driving Shaft)

The driving shaft 33 is arranged inside the cassette compartment 22. The driving shaft 33 may input a driving force to convey the printable tape to the printer cassette.

<Casing Cover>

The casing cover 4 is movable between a closed position (see FIG. 1A), in which the casing cover 4 covers at least a part of the cassette compartment 22, and an open position (see FIG. 1B), in which the printer cassette may be attached to the cassette compartment 22. When the casing cover 4 is at the closed position, the casing cover 2 may cover at least a part of the battery cover 5 attached to the casing 2.

According to the present embodiment, the casing cover 4 being at the closed position may cover the entire cassette compartment 22, the entire battery compartment 25 and the battery cover 5, and the entire printer 3. In other words, the casing cover 4 may cover the entire casing 2 from the front side to form a closed space, i.e., the cassette compartment 22, inside the casing 2.

The casing cover 4 includes a covering 41, the first rod portion 42, the second rod portion 43, a first arm 44, a second arm 45, a first restrictive portion 46A, a second restrictive portion 46B, a third restrictive portion 46C, a fourth restrictive portion 46D, and a fifth restrictive portion 46E.

(Covering)

The covering 41 is part of the casing cover 4 that covers the cassette compartment 22 and the battery compartment 25 when the casing cover 4 is at the closed position. The covering 41 may form the front face of the printing apparatus 1.

The covering 41 includes a cover claw 41A, which may engage with the main body 21 of the casing 2 when the casing cover 4 is at the closed position. The cover claw 41A is located on a leftward end of the covering 41 when the casing cover 4 is at the closed position. The casing cover 4 may stay at the closed position by the engagement of the cover claw 41A with the main body 41A.

(Rod Portions and Arms)

The first rod portion 42 and the second rod portion 43 are cylindrical portions in the casing cover 4, about which the covering 41 may pivot with respect the casing 2.

The first rod portion 42 penetrates the first bearing 23 in a direction parallel to a rotation axis of the first rod portion 42. The second rod portion 43 penetrates the second bearing 24 in a direction parallel to a rotation axis of the second rod portion 43.

The first arm 44 is a part of the casing cover 4 that couples the covering 41 with the first rod portion 42. The first arm 44 protrudes rearward from the covering 41 at one end thereof when the casing cover 4 is at the closed position. The first arm 44 is attached to the first rod portion 42 at the other end thereof, at which the arm 44 curves rightward, when the casing cover 4 is at the closed position.

The second arm 45 is a part of the casing cover 4 that couples the covering 41 with the second rod portion 43. The second arm 45 is in the same form as the first arm 44. The second arm 45 is located upward with respect to the first arm 44.

The first rod portion 42 and the second rod portion 43 have the rotation axes, which are parallel to the vertical direction. In particular, the rotation axes of the first rod portion 42 and the second rod portion 43 align on a same line parallel to the vertical direction. Therefore, the covering 41 may pivot about the rotation axes, which are parallel to the vertical direction through the first rod portion 42, the second rod portion 43, the first arm 44, and the second arm 45.

(Restrictive Portions)

The first, second, third, fourth, and fifth restrictive portions 46A, 46B, 46C, 46D, 46E may restrict the printer cassette from moving in a direction to separate from the cassette compartment 22 when the casing cover 4 is at the closed position.

The first, second, third, fourth, and fifth restrictive parts 46A, 46B, 46C, 46D, 46E protrude rearward from the covering 41 when the casing cover 4 is at the closed position. When the casing cover 4 is at the closed position, and if the printer cassette moves inside the cassette compartment 22 in a direction to approach the covering 41, i.e., frontward, the printer cassette may abut the first, second, third, fourth, and fifth restrictive parts 46A, 46B, 46C, 46D, 46E and may be restricted from moving further frontward.

<Battery Cover>

The battery cover 5 is attachable to the casing 2 separately from the casing cover 4 to cover at least a part of the battery compartment 25. In the present embodiment, the battery cover 5 may cover the battery compartment 25 entirely to form a closed space inside the battery compartment 25.

The battery cover 5 includes, as shown in FIGS. 4A-4C and 5A-5C, a first wall portion 51, a second wall portion 52, a pressing portion 53, and an enhancing portion 54.

(First Wall Portion)

The first wall portion 51 may cover a right-side face of the battery B located in the battery compartment 25 when the battery cover 5 is at the attached position in the casing 2.

The first wall portion 51 may slide rearward along the guide 27 of the casing 2 when the battery cover 5 is being attached to the casing 4. The first wall portion 51 includes a first end portion 51A, a second end portion 51B, a first wall face 51C, and the first claw 51D.

The first end portion 51A forms an end portion of the battery cover 5 to be located rearward when the battery cover 5 is at the attached position. The first end portion 51A is located in a vicinity of the destination portion 27B when the battery cover 5 is at the attached position.

The second end portion 51B forms an end portion of the battery cover 5 to be located frontward when the battery cover 5 is at the attached position. The second end portion 51B is located in a vicinity of the starting portion 27A when the battery cover 5 is at the attached position.

The first wall face 51C forms a rightward face of the first end portion 51A. The first claw 51D protrudes rearward from the first wall face 51C, The first claw 51D may engage with the first engageable portion 28 in the casing 2. The first claw 51D has the outer face 51E, which may contact the guide 27 when the battery cover 5 is being attached to the casing 2, The outer face 51E forms a part of a rightward face of the first claw 51D and spreads to intersect orthogonally with the crosswise direction.

(Second Wall Portion)

The second wall portion 52 may cover a frontward face of the battery B located in the battery compartment 25 when the battery cover 5 is at the attached position in the casing 2.

The second wall portion 52, when the battery cover 5 is located at the attached position, extends from the first wall portion 51 at a position closer to the starting portion 27A than the destination portion 27B in a direction intersecting with the outer face 51E of the first wall portion 51, In particular, the second wall portion 52 extends leftward from the second end portion 51B of the first wall portion 51, In the following paragraphs, the direction intersecting with the outer face 51E of the first wall portion 51, in which the second wall portion 52 extends from the first wall portion 51, may be called as an extending direction for the second wall portion 52. The second wall portion 52 includes a second wall face 52A and a second claw 52B (see FIG. 5B).

The second wall face 52A is located on a side opposite to the first wall portion 51 in the extending direction for the second wall portion 52. In particular, the second wall face 52A may form a rearward face at the leftward end of the second wall portion 52. The second claw 52B protrudes leftward from the second wall face 52A. The second claw 52B may engage with the second engageable portion 29 in the casing 2.

(Pressing Portion)

Figure 5A:
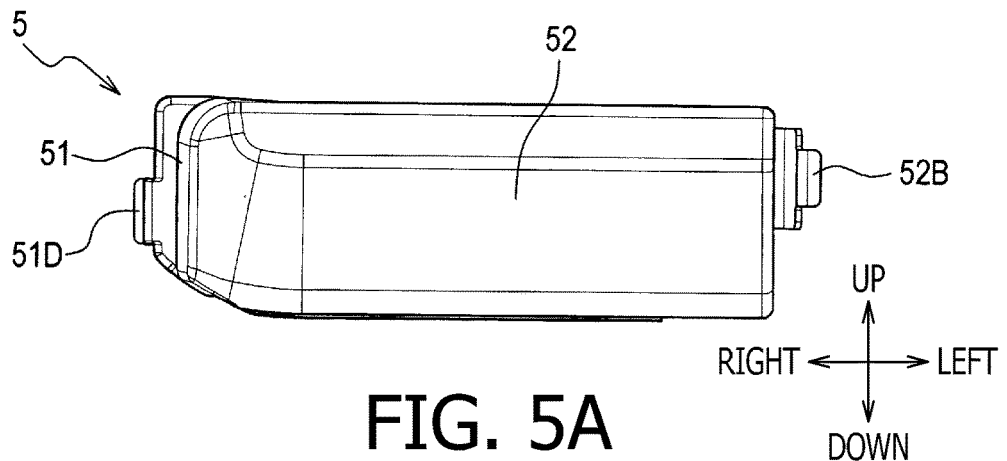
Figure 5B:
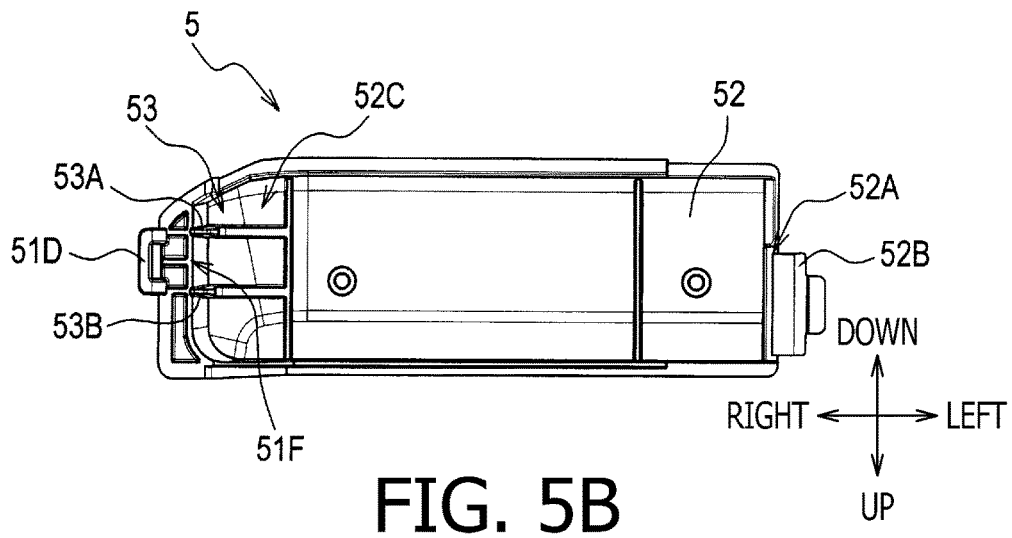
Figures 5C, 5D:
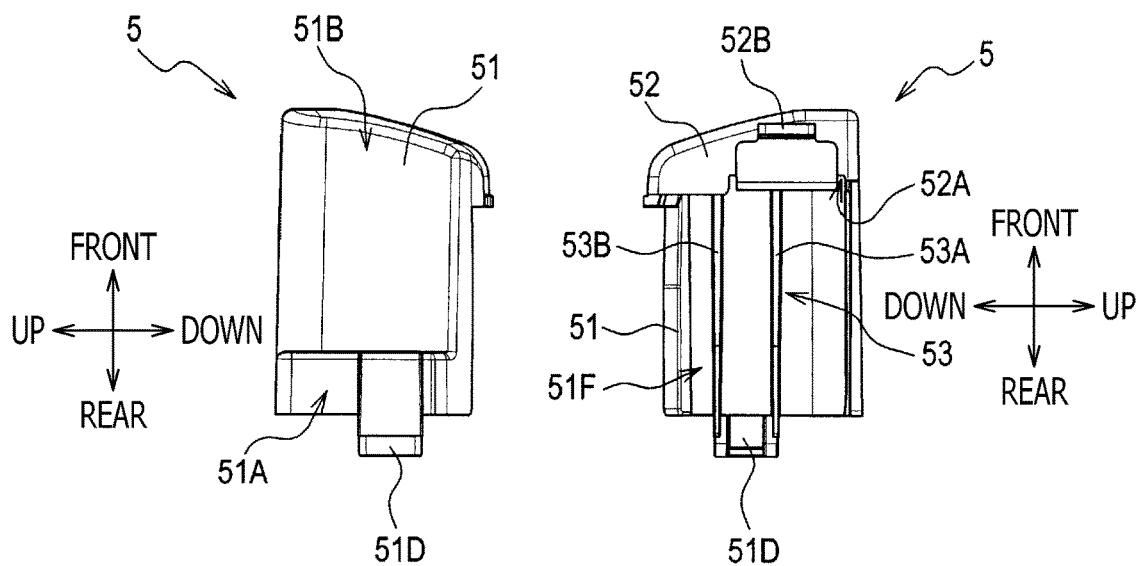

The pressing portion 53 shown in FIG. 5D is a part of the battery cover 5, which may press the battery B against the terminal 26 when the battery cover 5 is being attached to the casing 2.

As indicated by an arrow shown in FIG. 6, the pressing portion 53 may press the battery B leftward. In other words, a pressing direction for the pressing portion 53 to press the battery B is leftward. Therefore, the pressing direction by the pressing portion 53 intersects with the moving direction for the casing cover 4 moving from the open position to the closed position.

The pressing portion 53 includes a first rib 53A and a second rib 53B, which are laminar. The first rib 53A and the second rib 53B bridge over a boundary between an inner face 51F, which is on a side opposite to the outer face 51E, and an inner (rearward) face 52C of the second wall portion 52 (see FIG. 5B).

The first rib 53A and the second rib 53B extend in a slidable direction for the first wall portion 51, in other words, in the front-rear direction, along which the first wall portion 51 may slide when the battery cover 5 is being attached to the casing 2. A direction of thickness of the first rib 53A and of the second rib 53B is parallel to the vertical direction. The first rib 53A and the second rib 53B are arranged to be spaced apart from each other in the vertical direction.

As shown in FIG. 6, the first rib 53A has a pressing face 53C, which may contact the battery B. The pressing face 53C is a part of a leftward face of the first rib 53A. The pressing face 53C inclines in a posture such that, when the battery cover 5 is located at the attached position, a distance between the terminal 26 and the pressing face 53C reduces as the pressing face 53C extends frontward from the side of the first end portion 51A toward the side of the second end portion 51B along the first wall portion 51. The second rib 53B has a pressing face 53C, which is in the same form as the pressing face 53C of the first rib 53A.

With the pressing faces 53C in this posture, as the first wall portion 51 moves rearward to be closer to the attached position, an intensity of a pressing force to press the battery B against the terminal 26 from the pressing portion 53 may increase.

(Enhancing Portion)

The enhancing portion 54 is a laminar part of the battery cover 5 protruding from the first wall portion 51 in the extending direction for the second wall portion 52 to extend, i.e., leftward, and is connected to the second wall portion 52 at a frontward end thereof.

The enhancing portion 54 protrudes in a form such that a protrusive amount in the extending direction increases as the enhancing portion 54 extends frontward from the side of the first end portion 51A toward the side of the second end portion 51B along the first wall portion 51. In other words, the enhancing portion 54 has a shape of a right triangle, of which shorter one of adjacent sides is connected to a rear end of the second wall portion 52, and of which longer one of the adjacent sides is connected to a leftward end of the first wall portion 51.

As shown in FIG. 7, the enhancing portion 54 may, when the battery cover 5 is at the attached position, cover a part of the upper face of the battery B attached to the battery compartment 25.

(Attachment of the Battery Cover)

The battery cover 5 may be attached to the casing 2, when the casing cover 4 is at the open position, in a procedure described below.

As shown in FIG. 8, the battery cover 5 may be moved in a posture, in which the first end portion 51A proceeds ahead, in other words, in a posture, in which the first end portion 51A points rearward, causing the first end portion 51 to slide rearward along the guide 27 of the casing 2.

In particular, in a posture, in which the second wall portion 52 overlaps the battery B in the front-rear direction, in other words, in a posture, in which the extending direction for the second wall portion 52 coincides with the crosswise direction, the first wall portion 51 may be inserted between the battery B and the guide 27. In this arrangement, as the second wall portion 51 slides along the guide 27, the pressing portion 53 may press the battery B toward the terminal 26.

As the first wall portion 51 slides rearward, the first claw 51D may engage with the first engageable portion 28 in the casing 2. After the first claw 51D is engaged with the first engageable portion 28, the second wall portion 52 may be pressed against the battery B, and the second claw 52B may engage with the second engageable portion 29 in the casing 2. In this procedure, when the battery cover 5 is being attached to the casing 2, the first claw 51D may engage with the first engageable portion 28 before the second claw 52B engages with the second engageable portion 29.

The battery cover 5 may protrude outside the casing 2 at least partly when the battery cover 5 is at the attached position. For example, when the battery cover 5 is completely attached to the casing 2, the second wall portion 52 may be located frontward from the part of the main body 21 that defines the battery compartment 25, in other words, frontward from a bottom face of the main body 21 and from the inner wall 21A.

With the battery cover 5 being attached to the casing 2, and with the printer cassette being attached to the cassette compartment 22, the casing cover 4 may be moved to the closed position. When the casing cover 4 is at the closed position, the printing apparatus 1 may be ready for printing. The printing apparatus 1 may be operable in a posture, for example, in which the bottom face, i.e., a face closest the battery compartment 25, facing downward.

<Cutter>

The cutter 6 may cut the printable tape, on which an image is printed by the printer 2. As shown in FIG. 9, the cutter 6 is located at a leftward position in the casing 2. The cutter 6 has a blade, which is movable in the vertical direction. The printable tape cut by the cutter 6 may be ejected outside the casing 2 through the opening 21B formed in the main body 21.

As shown in FIG. 3A, the first rod portion 42, the cassette compartment 22, and the cutter 6 are arranged in this recited order from right to left along the crosswise direction. In other words, the first rod portion 42 is located rightward with respect to the cassette compartment 22, and the cutter 6 is located leftward with respect to the cassette compartment 22.

[1-2. Benefits]

In the paragraphs below, described will be benefits achievable from the printing apparatus 1 according to the present embodiment.

(1a) The first wall portion 51 of the battery cover 5 may slide on the guide 27 in a predetermined direction to guide the battery cover 5 to be; therefore, the battery cover 5 may be attached to the casing 2 easily. Moreover, the pressing portion 53 may press the battery B against the terminal 26 when the battery cover 5 is attached to the casing 2. Therefore, the electrical connection between the battery B and the terminal 26 may be secured.

(1b) The pressing faces 53C of the first rib 53A and the second rib 53B incline toward the terminal 26 when the battery cover 5 is in the posture to be attached to the casing 2. Therefore, as the first wall portion 51 slides on the guide 27, the pressure from the battery B against the terminal 26 and a reaction force generated in the battery cover 5 may increase gradually. Accordingly, the battery cover 5 may be attached to the casing 2 easily and smoothly.

(1c) The first wall portion 51 and the second wall portion 52 may cover the battery B in two directions; therefore, while the battery cover 5 may be easily attached to the casing 2, the battery B may be protected more reliably.

(1d) The enhancing portion 54 may enhance the unity between the first wall portion 51 and the second wall portion 52. Therefore, the battery cover 5 may be restrained from being deformed or damaged when the battery cover 5 is being attached to or removed from the casing 2.

(1e) The first rib 53A and the second rib 53B are arranged to bridge over the boundary between the first wall portion 51 and the second wall portion 52. Therefore, the unity between the first wall portion 51 and the second wall portion 52 may be enhanced. Therefore, the battery cover 5 may be restrained from being deformed or damaged.

(1f) With the first claw 51D in the first wall portion 51 being arranged to contact the guide 27, the first claw 51D may be guided reliably to the first engageable portion 28. Accordingly, the battery cover 5 may be attached to the casing 2 more reliably.

(1g) When the battery cover 5 is being attached to the casing 2, the second claw 52B may engage with the second engageable portion 29 after the first claw 51D engages with the first engageable portion 28. Therefore, with the pressing portion 53 pressing the battery B against the terminal 26, the second wall portion 52 may be reliably placed to the correct position with respect to the casing 2.

(1h) When the battery cover 5 is at the attached position, the battery cover 5 protrudes at least partly outside the casing 2. Therefore, a user may access the battery cover 5 located at the attached position easily. Accordingly, the battery cover 5 may be removed by the user easily from the casing 2.

2. More Examples

Although an example of carrying out the invention have been described, it is to be understood that the subject matter defined in the appended claims is not necessarily limited to the specific features or act described above. Rather, the specific features and acts described above are disclosed as example forms of implementing the claims.

(2a) For example, the casing cover may not necessarily cover the entire cassette compartment and the entire battery cover but may cover the cassette compartment partly. For another example, the casing cover may not necessarily cover but may expose the battery cover. In other words, the battery compartment may be arranged at a position, in which the battery compartment is not covered with the casing cover.

(2b) For another example, the casing cover may not necessarily be pivotable with respect to the casing but may be, for example, slidable with respect to the casing or may be, for another example, detachable from the casing.

(2c) For another example, the battery cover may not necessarily cover the battery compartment entirely but may cover the battery compartment partly. For another example, the battery cover may be formed of a part of the casing cover.

(2d) For another example, the pressing portion of the battery cover may not necessarily have the form of the ribs but may have, for example, a form of protrusions protruding toward the terminal on the casing.

(2e) For another example, the first wall portion may not necessarily contact the guide at the first claw but may contact the guide at another part thereof.

(2f) For another example, the printer cassette to be attached to the cassette compartment may not necessarily include the printable tape alone but may include an ink ribbon and a laminated tape additionally.

(2g) For another example, a function assigned to one of the components in the printing apparatus described above may be divided and assigned to multiple pieces of components, or multiple functions assigned to multiple pieces of components in the printing apparatus described above may be combined to be assigned to a single piece of component. For another example, one or more components may be omitted. For another example, one or more examples (2a)-(2f) described above may be added to or replace the component(s) in the printing apparatus 1 described earlier. Those skilled in the art will appreciate that there are numerous variations and permutations of the printing apparatus that fall within the spirit and scope of the disclosure as set forth in the appended claims.

What is claimed is:

1. A printing apparatus, comprising:
    a casing including:
        a battery compartment, to which a battery is attachable; and
        a terminal arranged inside the battery compartment;
    a printer configured to be powered by the battery to print an image on a printable tape; and
    a battery cover attachable to the casing, the battery cover located at an attached position in the casing being configured to cover at least a part of the battery compartment,
    wherein the casing includes a guide arranged outside the battery compartment, the guide being configured to guide the battery cover toward the attached position in the casing,
    wherein the battery cover includes:
        a first wall portion having an outer face, the first wall portion being configured to contact the guide at the outer face and slide along the guide as the battery cover moves toward the attached position; and
        a pressing portion configured to press the battery in the battery compartment against the terminal as the first wall portion slides along the guide.

2. The printing apparatus according to claim 1,
    wherein the guide includes:
        a starting portion, at which the outer face of the first wall portion contacts the guide earlier when the battery cover is being attached to the casing; and a destination portion, at which the outer face of the first wall portion contacts the guide lastly when the battery cover is being attached to the casing, wherein the first wall portion includes:
- a first end portion configured to be located closer to the destination portion than the starting portion when the battery cover is located at the attached position; and
- a second end portion configured to be located closer to the starting portion than the destination portion when the battery cover is located at the attached position, wherein the pressing portion includes at least one rib arranged on an inner face of the first wall portion on a side opposite to the outer face, the at least one rib extending in a direction, in which the first wall portion slides, wherein the at least one rib includes a pressing face, at which the pressing portion of the battery cover moving toward the attached position contacts the battery, and wherein the pressing face inclines, when the battery cover is located at the attached position, in a posture such that a distance between the terminal and the pressing face reduces as the pressing face extends from the first end portion toward the second end portion.

3. The printing apparatus according to claim 1,
wherein the guide includes:
- a starting portion, at which the outer face of the first wall portion contacts the guide earlier when the battery cover is being attached to the casing; and
- a destination portion, at which the outer face of the first wall portion contacts the guide lastly when the battery cover is being attached to the casing, and wherein the battery cover includes a second wall portion, the second wall portion extending from the first wall portion at a position closer to the starting portion than the destination portion, when the battery cover is located at the attached position, in an extending direction intersecting with the outer face of the first wall portion.

4. The printing apparatus according to claim 3,
wherein the battery cover includes an enhancing portion protruding from the first wall portion in the extending direction, the enhancing portion being connected to the second wall portion, wherein the first wall portion includes:
- a first end portion configured to be located closer to the destination portion than the starting portion when the battery cover is located at the attached position; and
- a second end portion configured to be located closer to the starting portion than the destination portion when the battery cover is located at the attached position, and wherein the enhancing portion protrudes in a form such that a protrusive amount in the extending direction increases as the enhancing portion extends from the first end portion toward the second end portion.

5. The printing apparatus according to claim 3,
wherein the pressing portion includes at least one rib bridging over a boundary between on an inner face of the first wall portion on a side opposite to the outer face and an inner face of the second wall portion.

6. The printing apparatus according to claim 1,
wherein the first wall portion of the battery cover includes:
- a first wall face; and
- a first claw protruding from the first wall, and wherein the casing includes a first engageable portion configured to engage with the first claw when the battery cover is located at the attached portion.

7. The printing apparatus according to claim 6,
wherein the first claw has the outer face, and
wherein the outer face of the first claw is configured to contact the guide as the battery cover moves toward the attached position.

8. The printing apparatus according to claim 6,
wherein the guide includes:
- a starting portion, at which the outer face of the first wall portion contacts the guide earlier when the battery cover is being attached to the casing; and
- a destination portion, at which the outer face of the first wall portion contacts the guide lastly when the battery cover is being attached to the casing, and wherein the battery cover includes a second wall portion, the second wall portion extending from the first wall portion at a position closer to the starting portion than the destination portion, when the battery cover is located at the attached position, in an extending direction intersecting with the outer face of the first wall portion, wherein the second wall portion includes:
- a second wall face arranged on a side opposite to the first wall face in the extending direction; and
- a second claw protruding from the second wall face, and wherein the casing includes a second engageable portion configured to engage with the second claw when the battery cover is located at the attached position.

9. The printing apparatus according to claim 8,
wherein the first claw is configured to engage with the first engageable portion prior to engagement of the second claw with the second engagement portion when the battery cover is being attached to the casing.

10. The printing apparatus according to claim 1,
wherein at least a part of the battery cover protrudes outside the casing when the battery cover is located at the attached position.

* * * * *